March 1, 1966  J. KIRSCH  3,237,783
SELF-ADJUSTING CUSHIONED VEHICLE COUPLER ARRANGEMENT
Filed Jan. 15, 1964  3 Sheets-Sheet 1

March 1, 1966   J. KIRSCH   3,237,783
SELF-ADJUSTING CUSHIONED VEHICLE COUPLER ARRANGEMENT
Filed Jan. 15, 1964   3 Sheets-Sheet 2

INVENTOR.
JERRY KIRSCH
BY Barthel & Bugbee
ATTORNEYS

March 1, 1966  J. KIRSCH  3,237,783
SELF-ADJUSTING CUSHIONED VEHICLE COUPLER ARRANGEMENT
Filed Jan. 15, 1964
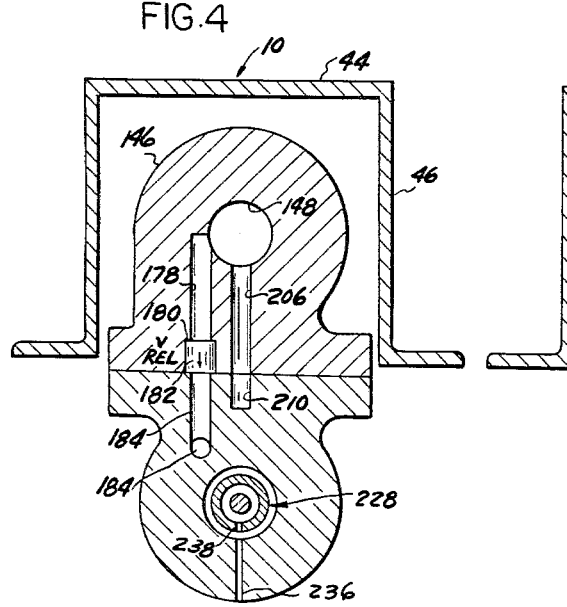
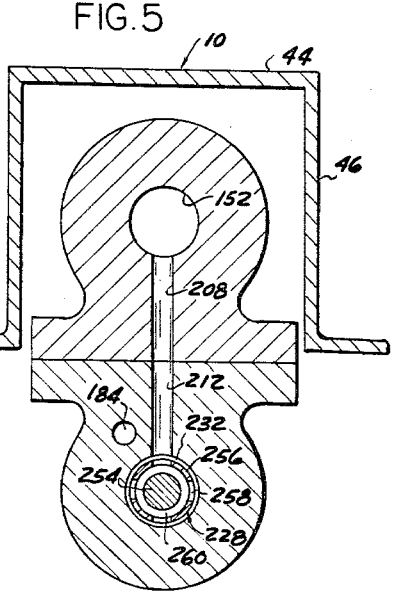
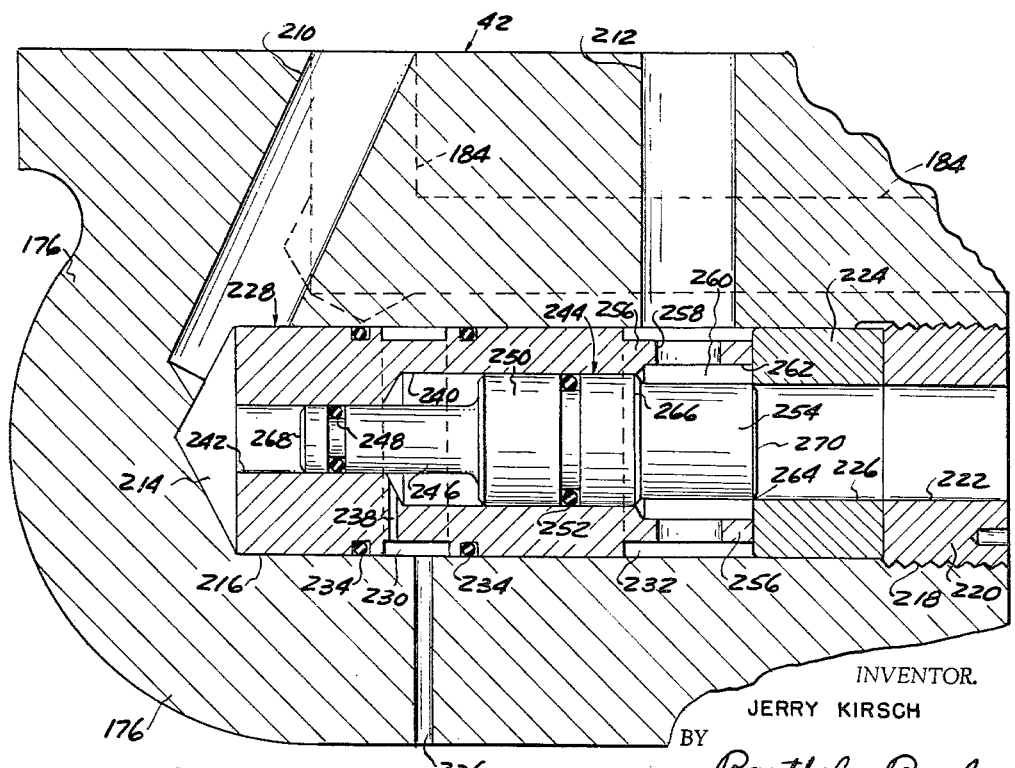
INVENTOR.
JERRY KIRSCH
BY Barthel & Bugbee
ATTORNEYS United States Patent Office 3,237,783
Patented Mar. 1, 1966

3,237,783
SELF-ADJUSTING CUSHIONED VEHICLE
COUPLER ARRANGEMENT
Jerry Kirsch, 3946 Bishop Road, Detroit, Mich.
Filed Jan. 15, 1964, Ser. No. 337,790
21 Claims. (Cl. 213—43)

This invention relates to shock cushioning arrangements and, in particular, to impact shock cushioning arrangements for coupled vehicles, such as railway vehicles, highway trailers and the like.

Hitherto, much damake has been caused to fragil cargo carried by railway vehicles or highway trailers by the impact shocks resulting from the coupling of the towed vehicles to the towing vehicles. When the towing vehicle, such as a railway locomotive or railway vehicle, or highway trailer preceding another highway trailer, is backed into coupling engagement with the towed vehicle, the shock of coupling impact has been transmitted to the cargo or other load, with consequent breakage or damage. The present invention provides a self-adjusting cushioned coupling arrangement for such coupled vehicles which gradually absorbs at a controlled rate of deceleration the kinetic energy developed as a result of the coupling impact and then resupplies the stored energy at a controlled rate of acceleration to return it to the coupling to return it to its normal position.

Accordingly, one object of this invention is to provide a self-adjusting cushioned vehicle coupler arrangement for coupled vehicles which absorbs the kinetic energy arising from impact of the coupling vehicle within the coupled vehicle during coupling, wherein the cushioning arrangement is connected to the coupler of one of the vehicles, which is arranged to move yieldingly following impact in a precisely-controlled manner.

Another object is to provide a self-adjusting cushioned vehicle coupler arrangement of the foregoing character wherein the impact shock absorption is performed by a hydropneumatic cushioning system which produces a precisely-controlled deceleration after impact, followed by a likewise precisely-controlled acceleration returning the moving parts to their normal positions, thereby preventing shock damage to the load or cargo carried by the vehicle.

Another object is to provide a self-adjusting cushioned vehicle coupler arrangement of the foregoing character which is self-adjusting according to the magnitude of the coupling shock so as to absorb the kinetic energy of impact either in one cycle of operation or in a succession of such cycles by a self-adjusting action which automatically controls the deceleration of the coupling upon impact and the acceleration thereof upon recoil to its original position.

Another object is to provide a self-adjusting cushioned vehicle coupler arrangement of the foregoing character wherein the coupler is connected to a hydraulic initial energy absorber having a piston which, upon impact, pushes hydraulic fluid through a fluid flow restricting orifice into a high-pressure low-volume primary hydropneumatic accumulator while a differential pressure exists on opposite sides of the orifice; and, upon equalization of this pressure differential, diverts hydraulic fluid into a low-pressure high-volume secondary hydropneumatic storage accumulator which, upon absorption of the kinetic energy of coupling, automatically returns the hydraulic fluid to the coupling-connected initial energy absorber cylinder at a controlled rate, preventing excessive acceleration during recoil.

Another object is to provide a self-adjusting cushioned vehicle coupler arrangement, as set forth in the object immediately preceding, wherein the diverting of hydraulic fluid is performed by a self-adjusting pressure-responsive valve which shifts automatically in response to equalization of pressure on opposite sides of the flow-restricting orifice ro divert hydraulic fluid into the secondary storage accumulator but shifts back to its closed position after such diversion again sets up a differential pressure, and repeats this operation in successive cycles until all of the kinetic energy transmitted by the hydraulic fluid from the coupling has been absorbed, whereupon the thus-stored energy in the primary and secondary accumulators acts in a reverse direction to return the impact piston and coupler to their original positions before impact.

Other objects and advantages of the invention will become apparent during the course of the following description of the accompanying drawings, wherein:

FIGURE 5 is a vertical cross-section taken along the line 4—4 in FIGURE 3;

FIGURE 5 is a vertical cross-section taken along the line 5—5 in FIGURE 3; and

FIGURE 6 is a further enlarged fragmentary central vertical section through the self-sensing interphase or bypass valve shown in the lower central portion of FIGURE 3.

Figure 1:
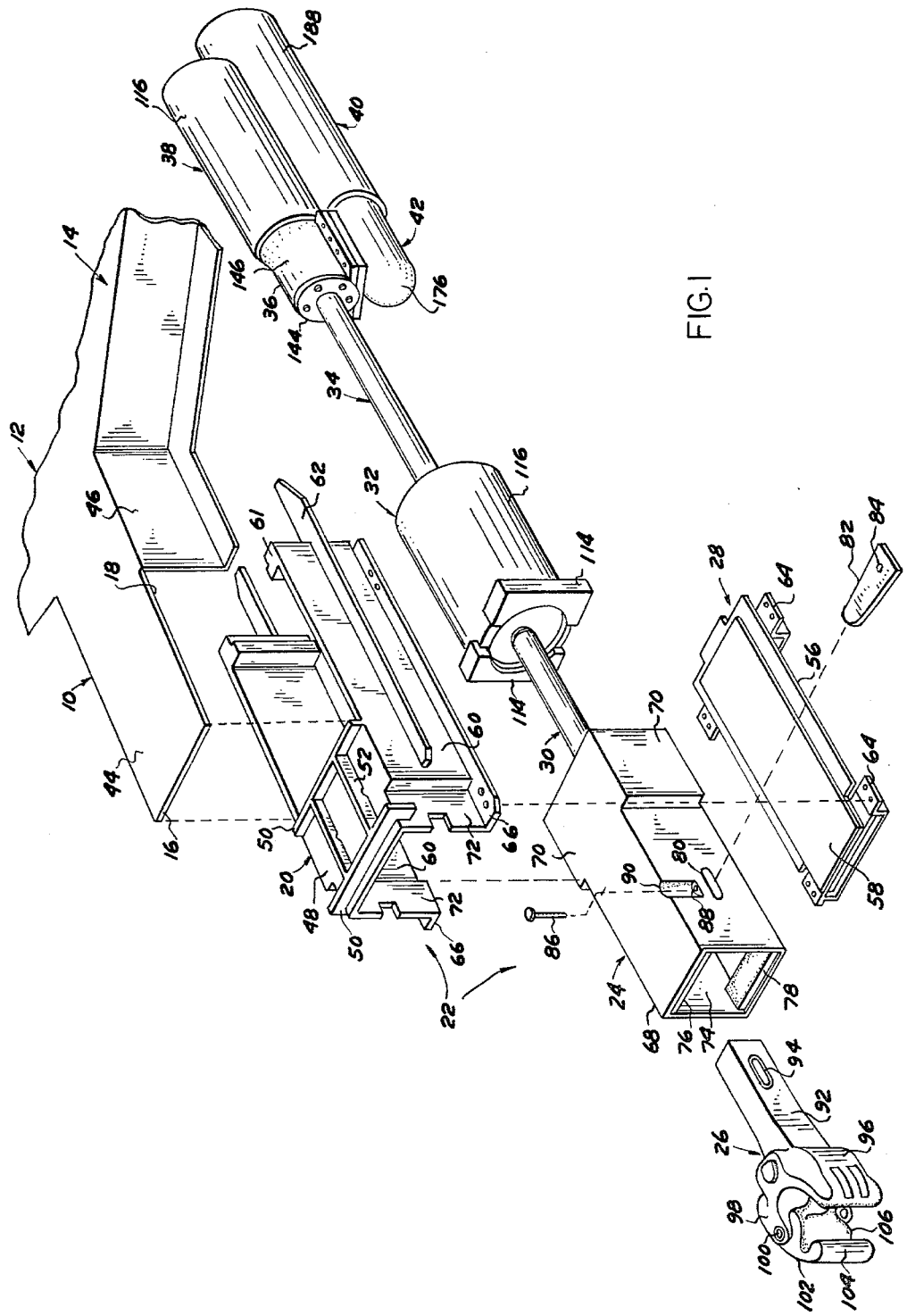
FIGURE 1 is an exploded perspective view of a self-adjusting cushioned coupler arrangement, according to one form of the invention with the vehicle frame member to which it is attached shown at the top of figure.

Referring to the drawings in detail, FIGURE 1 shows the forward portion 10 of the center sill 12 of a railway vehicle frame 14, such as of a standard freight car, which has been cut off at 16 at the front end and has been provided with cut-back side openings 18 to receive the couple. adapter housing, generally designated 20, of the self-adjusting cushioned vehicle coupler arrangement, generally designated 22, of the present invention. The housing 20 slidably receives a coupler adapter 24 which in turn is adapted to receive a standard railway car coupler, generally designated 26. The housing 20 further includes a closure plate or adapter support 28. Connected to the adapter 24 is a drive rod 30 which transmits force to an initial energy absorber 32. The latter transmits hydraulic fluid through an oil transport conduit 34 to a fluid flow-restricting orifice unit 36 forming one end of a high-pressure low-volume primary hydropneumatic accumulator 38 below which is a low-pressure high-volume secondary hydropneumatic accumulator 40 connected to the accumulator 38 through a self-adjusting interphase valve unit 42.

Figure 2:
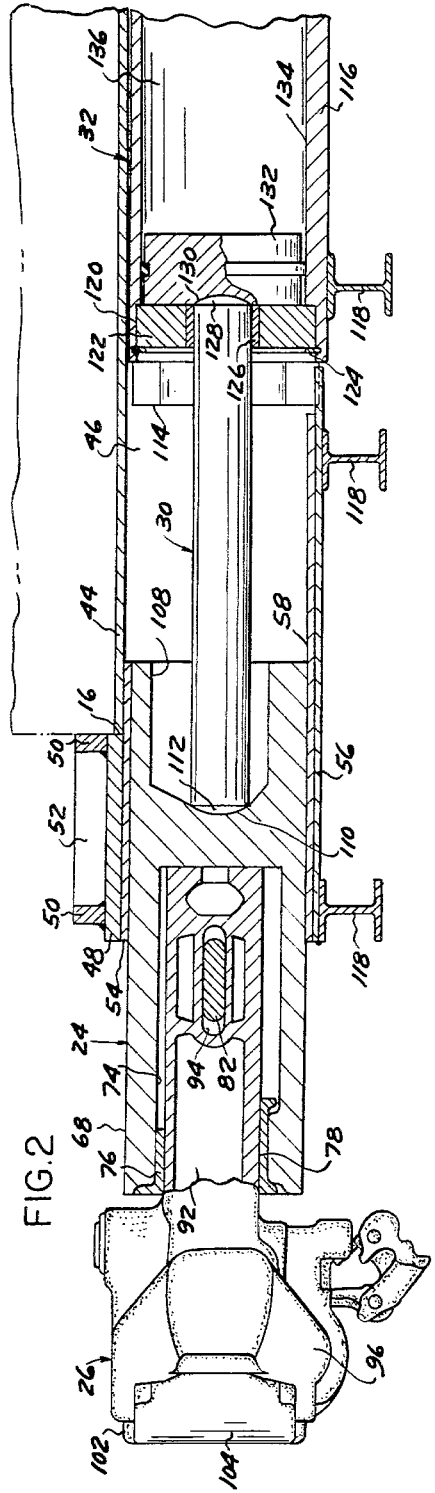
FIGURES 2 and 3 are respectively enlarged central vertical sections through the forward and rearward portions of the self-adjusting cushioned coupler arrangement as attached to the vehicle, the left-hand end of FIGURE 3 being substantially a continuation of the right-hand end of FIGURE 2.

The center sill 12 of the railway car frame 14 is of standard channel construction which is altered as stated above, by cutting off the top web 44 at the front end 16 and cutting out the side flanges 46 at 18. The top wall 48 of the housing 20 is provided with a pair of upstanding cross ribs 50 (FIGURE 2) and a pair of spaced upstanding parallel longitudinal ribs 52 welded or otherwise secured to one another and to the top wall 48. The latter, with its rearward rib 50 is in turn welded or otherwise secured to the front end 16 of the center sill web 44. Secured to the under side of the upper wall 48 is an upper bearing plate 54 and similarly secured to the upper side of the wall 56 of the closure plate 28 is a lower bearing plate 58. The plates 54 and 58 together with the side walls 60 of the housing 20 form guide surfaces for the coupler adapter 24 as it slides back and forth during operation, as described below. The side walls 60 are provided with internal stop ribs 61 at their rearward ends for the adapter 24 and with external reinforcing ribs 62. Secured to the wall 56 of the cover plate 28 are parallel brackets 64 (FIGURE 1) which in turn are bolted to the lower side flanges 66 of the housing 20.

The coupler adapter 24 is in the form of an approximately T-shaped hollow block 68 with lateral extensions 70 at the rearward end thereof engaging the side walls 60 of the housing 20 but prevented from withdrawal by the inwardly-spaced side wall extensions 72 of the housing 20. The forward end of the adapter block 68 is provided with a forward socket 74 (FIGURE 2), the mouth of which is provided with upper and lower bearing plates or wear plates 76 and 78 respectively. The block 68 is also provided with a side wall hole 80 of elongated cross-section adapted to receive a coupling key 82, the outer end of which has a hole 84 which receives a retaining pin or other fastener 86 inserted through a bottom hole 88 in a side wall recess 90 of the adapter block 68.

The railway car coupler 26 is of conventional design and has a shank 92 (FIGURE 1) of rectangular cross-section fitting into the socket 74 in the adapter block 24, and is provided with a lateral slot 94 of elongated cross-section which receives the coupling key 82. The forward end of the shank 92 carries an integral fixed coupling jaw 96 and arcuate arms 98 which are drilled to receive a pivot pin 100 upon which a movable coupling jaw 102 is pivotally mounted. The movable coupling jaw 102 has the usual forward flange 104 and rearward abutment arm 106 which is engaged by the coupling element (not shown) of the towing vehicle during coupling, to swing the coupling jaw 102 around its pivot pin 100 so as to close the gap between the fixed coupling jaw 96 and flange 104 of the movable coupling jaw 102, as is well known to those skilled in the railway art.

The block 68 of the coupler adapter 24 is provided with a rearward socket 108 (FIGURE 2) having a spherically-curved concave bearing set 110 at its inner end engaged by the correspondingly-curved spherical convex forward end 112 of the drive rod 30. The rearward portion of the drive rod 30 passes between a pair of spaced vertical abutment blocks 114 which are secured, as by welding, at their outer vertical edges to the adjacent flanges or side walls 46 of the channel-shaped center sill 10 and which in turn are engaged by the forward end of the cylinder 116 of the hydraulic initial energy absorber 32. The cover or supporting plate 28 and the forward end of the hydraulic cylinder 116 are supported on transverse I-beams 118 which in turn are secured to the frame 14.

The forward end of the initial energy absorber cylinder 116 is counterbored as at 120 (FIGURE 2) to receive a cylinder head 122 and is grooved to receive a head retaining snap ring 124. The head 122 is provided with a bearing bushing 126 which slidably receives and guides the rearward end portion of the drive rod 30. The latter, like its forward end 112, has a spherical rearward end 128 which engages a correspondingly-curved spherical concave seat 130 in a piston 132 which is reciprocably mounted in the cylinder bore 134 of the hydraulic cylinder 116 and which, with the cylinder 116, defines a first hydraulic fluid chamber 136. The rearward end wall 138 of the cylinder 116 (FIGURE 3) is provided with an outlet port 140. Bolted to the end wall 138 is the forward end flange 142 of the hydraulic fluid transport conduit 34, the rearward end flange 144 of which is bolted to the forward face of the housing block 146 of the flow-restricting orifice unit 36. The flanges 142 and 144 for manufacturing convenience are collars which are welded to the forward and rearward ends of the oil transport conduit 34.

The orifice housing block 146 of the fluid flow-restricting orifice unit 36 contains a forward longitudinal passageway 148 (FIGURE 3) aligned with the oil transport conduit 34 and in turn communicates through a restricted for reduced-diameter fluid throttling orifice 150 with a rearward longitudinal passageway 152. The rearward end of the orifice housing block 146 is annular and threaded at 154 to receive the correspondingly-counterbored and threaded forward end 156 of the cylinder 158 of the high-pressure low-volume hydropneumatic accumulator 38. The latter is provided with a rearward end wall 160 drilled and threaded as at 162 to receive a pneumatic charging valve 164 by which a gas, such as nitrogen, is inserted at high pressure into the rearward gas chamber 166 formed by the cylinder bore 168 and end wall 160 and a free piston 170 freely reciprocable in the cylinder bore 168. Forward of the piston 170 is a forward hydraulic chamber 172. The free piston 170 is provided with a concave forward face 173 to enable the hydraulic fluid, such as oil, to reach all portions thereof at all times.

Figure 3:
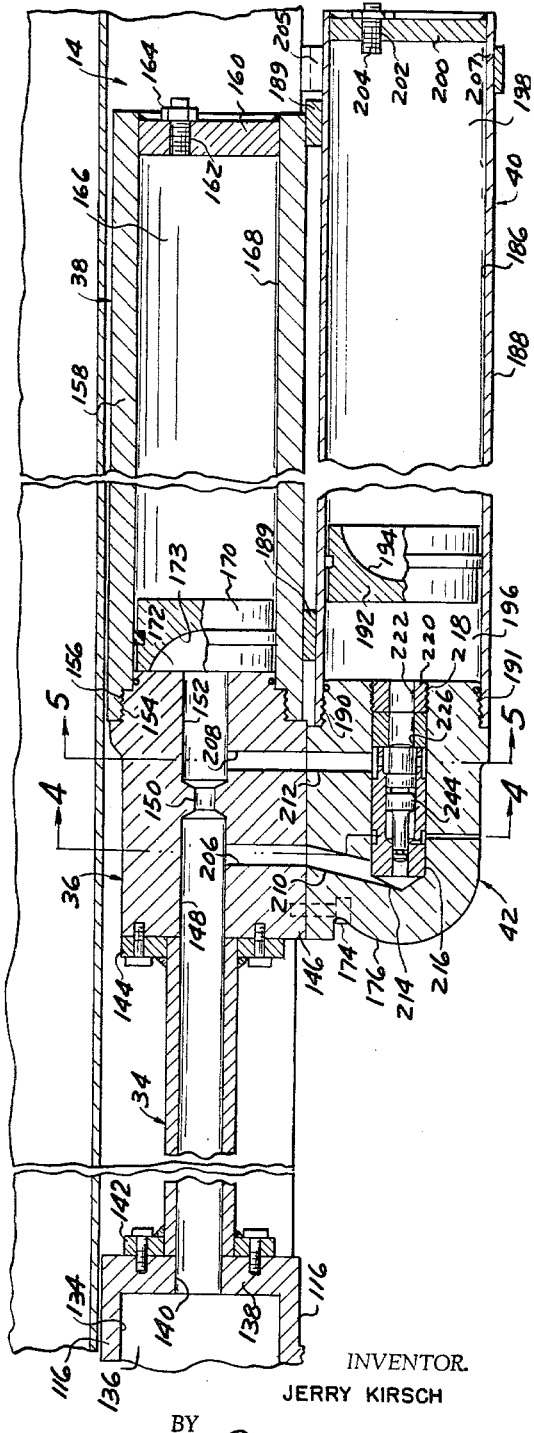

Bolted as at 174 (FIGURE 3) to the flanged bottom of the housing block 146 is the flanged top of the casing 176 (FIGURE 6) of the self-adjusting interphase valve unit 42. Extending from the forward passageway 148 (FIGURE 4) downward within the housing block 146 is an upper bypass passageway 178 terminating in a counterbore 180. Mounted in the lower end of the counterbore 180 is a conventional high pressure relief valve 182 which, together with the housing block 146, constitutes the flow-restricting orifice unit 36. The relief valve 182 at its set pressure opens communication with a lower L-shaped or angle bypass passageway 184 which continues rearwardly through the valve casing 176 (FIGURE 5) and opens into the forward end of the cylinder bore 186 of the cylinder 188 of the low-pressure high-volume primary accumulator 40 (FIGURE 3). The two cylinders 158 and 188 are maintained in spaced parallel relationship by spacers 189 therebetween. The rearward end of the valve casing 176 is annular and threaded as at 190 to receive the correspondingly threaded counterbored forward end 191 of the primary accumulator cylinder 188. A free piston 192 with a concave rearward face 194 is reciprocable in the cylinder bore 186 and divides it into a forward oil chamber 196 and a rearward gas chamber 198. The secondary accumulator cylinder 188 is provided with a rearward wall or head 200 welded therein which is drilled and threaded as at 202 to receive a gas charging valve 204 similar to the charging valve 164. A hanger 205 is secured to and depends from the vehicle frame 14 and contains a hole 207 which receives and holds the rearward end of the accumulator cylinder 188.

The housing block 146 of the flow-restricting or throttling orifice unit 36 is also provided with spaced parallel upper vertical forward and rearward transverse passageways 206 and 208 respectively which open respectively into lower forward and rearward transverse passageways 210 and 212 (FIGURE 6). The passageway 210 opens into the end chamber or control chamber 214 of an elongated cylindrical casing bore 216 opening into the forward chamber 196 of the cylinder 188 and there counterbored and threaded as at 218 to receive a threaded hollow plug 220. The hollow plug 220 has a bore 222 therethrough and holds within the casing bore 216 a stop collar 224 containing a bore 226 aligned with the plug bore 222. The stop collar 224 holds in position within the casing bore 216 an approximately cylindrical valve body 228 containing axially-spaced annular external channels or passageways 230 and 232 respectively. The valve body 228 on opposite sides of the channel 230 is grooved to receive O-rings 234 in order to prevent the leakage of fluid between the valve body 228 and casing bore 216. An external drain passageway 236 removes any hydraulic fluid which may leak past the O-rings 234. An internal radial drain passageway 238 leads from the annular channel 230 inwardly to the left-hand end of a valve counterbore 240 which in turn opens into a valve bore 242 extending into and forming a part of the end chamber 214.

Reciprocably mounted in the valve counterbore 240 is a piston valve member, generally designated 244 (FIGURE 6), having at its left-hand end a reduced diameter portion or control motive portion 246 slidable in the valve bore 242 and grooved to receive an O-ring 248 to prevent leakage. The valve member 244 intermediate its opposite ends is provided with a guide head 250 which snugly but slidably engages the valve bore 240 and which is grooved to receive an O-ring 252 for further leakage prevention. The valve member 244 at its right-hand end terminates in a slightly reduced diameter valve head 254.

The annular channel 232 surrounds a reduced diameter portion 256 of the valve body 228 which is provided with four radial ports 258 (FIGURES 5 and 6) opening into an annular space or fluid distribution chamber 260 surrounding the valve head 254 and extending between it and a counterbore 262. The left-hand or inner end of the collar 224 at its junction with the bore 226 forms a valve seat 264 engaged by the valve head 254 in the closed position of the valve member 244. An annular valve-balancing piston area or surface 266 equal to and thus in predetermined one-to-one ratio with the forward end control piston area or surface 268 on the reduced diameter valve member portion 246 balances the piston valve member 244 when the pressures in the forward and rearward passageways 210 and 212 are momentarily equal, or in a predetermined one-to-one ratio, as occurs during the operation of the invention, as set forth below. A different ratio of these areas 268 and 266 to one another would of course result in a correspondingly different ratio of pressures required to balance the piston valve member 244. The rearward end of the piston valve member 244 has a rearward end piston area 270 subject to pressure within the bore 222 and 226.

In the operation of the invention let it be assumed that the locomotive or other tractor vehicle either backs its coupling member directly into engagement with the coupler 26 or backs the coupling member of a towed vehicle, such as a railway car or highway trailer, into engagement therewith, causing impact and coupling. This engagement moves rearwardly the coupler adapter 24 (FIGURE 2) and with it the drive rod 30 and piston 132 of the first stage energy absorption unit 32, driving the oil or other hydraulic fluid in the chamber 136 thereof rearwardly through the outlet port 140 and through the oil transport conduit 34 into the forward longitudinal passageway 148, where its flow is retarded by the throttling action of the restricted orifice 150 (FIGURE 3).

The flow of oil through the restricted orifice 150 absorbs the coupling impact energy and at the same time creates a differential pressure of fluid on opposite sides of the orifice 150, namely between the forward and rearward longitudinal passageways 148 and 152. The higher pressure momentarily existing in the forward longitudinal passageway 148 is transmitted through the forward transverse passageways 206 and 210 (FIGURE 6) into the forward end chamber 214 of the casing 176 of the interphase valve 42 where it acts against the forward end piston area 268 of the piston valve member 244 to unbalance the latter and shift it rearwardly so that the valve head 254 engages the annular valve seat 264 and closes off communication between the rearward transverse passageways 208, 212 and the storage accumulator chamber 196 (FIGURE 3).

Meanwhile, the pressure transmitted by the hydraulic oil or other fluid flowing through the restricted orifice 150 pushes the piston 170 of the high-pressure low-volume accumulator 38 rearwardly so as to further compress the already highly compressed gas therein until the pressures are balanced in the forward and rearward longitudinal passageways 148 and 152 on opposite sides of the restricted or throttling orifice 150. When balancing of pressures thus occurs, the pressures in the transverse passageways 206, 210 and 208, 212 are balanced, consequently balancing the pressures on the equal-area piston surfaces 268 and 266 of the piston valve member 244. When this occurs, the low-pressure gas in the rearward chamber 198 of the low-pressure high-volume accumulator 40 pushes its piston 192 and the oil in its forward chamber 196 forward against the rearward end piston area 270 of the piston valve member 244, shifting the latter forward off the valve seat 264 so as to open communication between the rearward longitudinal passageway 152, rearward transverse passageways 208, 212 and forward chamber 196 of the low-pressure high-volume accumulator 40, forcing the piston 192 thereof rearwardly and further compressing the low-pressure gas in the rearward chamber 198 thereof.

Assuming that the coupling impact has been gentle so as to produce a low amount of kinetic energy which has been fully absorbed by the foregoing single cycle of operation, the piston valve member 244 remains in its forwardly-shifted position by the overbalancing of pressure on its rearward piston areas 266, 270 over its forward piston area 268, permitting the oil under pressure to flow reversely (FIGURES 3 and 6) from the forward end chamber 196 through the passageways 222, 226, 212, 208, rearward longitudinal passageway 152, restricted orifice 150, forward passageway 148 and oil transport conduit 34 into the hydraulic chamber 136 of the first stage hydraulic energy absorption unit 32. This pressure fluid pushes against the piston 132 thereof (FIGURE 2), pushing it forwardly and with it the drive rod 30, coupler adapter 24 and coupler 26, back to their original positions.

If, on the other hand, the coupling impact is so great that it has not been fully absorbed in a single cycle of operation as described above, by the first opening motion of the piston valve member 244 of the interphase valve 42, the dumping of the second stage hydraulic pressure fluid, such as oil, rearwardly of the restricted orifice 150 again reduces the pressure differential between the forward and rearward longitudinal passageways 148 and 152 on opposite sides of the restricted orifice 150 (FIGURE 3), again causing unbalancing and consequent shifting of the piston valve member 244 rearwardly so that its valve head 254 again contacts the annular valve seat 264, again cutting off communication with the forward hydraulic chamber 196 of the low-pressure high-volume accumulator 40. This action temporarily prevents hydraulic pressure fluid from being dumped from the forward hydraulic chamber 172 of the high-pressure low-volume accumulator 38 through the passageways 152, 208, 212, 226, 222 into the forward hydraulic chamber 196 of the low-pressure high-volume accumulator 40 and thereby causes the pressure of the oil rearwardly of the restricted orifice 150 and in the forward high-pressure hydraulic chamber 172 to rise until it again balances with the pressure in the forward longitudinal passageway 148 on the opposite side of the restricted orifice 150. This action unbalances and shifts open the piston valve member 244 of the interphase valve unit 42, again dumping the high-pressure oil from the forward high-pressure oil chamber 172 of the high-pressure low-volume accumulator 38 through the passageways 152, 208, 212, 226 and 222 into the forward hydraulic chamber 196 of the low-pressure high-volume accumulator 40, forcing the piston 194 thereof rearwardly another step until the flow of oil through the restricted orifice 150 from the forward longitudinal passageway 148 to the rearward longitudinal passageway 152 again causes balancing of pressures on opposite sides of the restricted orifice 150. This action again unbalances the piston valve member 244, again shifting it to the left into its open position and again dumping hydraulic fluid into the forward hydraulic chamber 196 of the low-pressure high-volume accumulator 40, causing the piston 192 thereof to move another step rearwardly (to the right in FIGURE 3).

The foregoing action then repeats itself as long as there is kinetic energy of impact to be absorbed and as long as a differential pressure exists between the forward and rearward longitudinal passageways 148 and 152 on opposite sides of the restricted orifice 150, causing a hunting motion or reciprocation of the piston valve member 244, and a rapid reciprocation of the piston 170 in the high-pressure low-volume accumulator 38 while the piston 192 in the low-pressure high-volume accumulator 40 moves step-by-step rearwardly, moving one step at each reciprocation of the piston valve member 234. When this alternating or hunting action of the piston valve member 244 ceases upon absorption of all of the kinetic energy of impact, the pressure on opposite sides of the restricted orifice 150 remains balanced (FIGURE 3) after the last dumping action from the forward high-pressure hydraulic chamber 172 of the high-pressure accumulator 38 into the forward hydraulic chamber 196 of the low-pressure accumulator 40. The pressure within the forward chamber 196 of the low-pressure accumulator 40 then holds the piston valve member 244 open while its hydraulic pressure fluid flows out reversely in the manner described above through the passageways 222, 226, 212, 208, 152, restricted orifice 150, passageway 149, oil transport conduit 34 and port 140 into the hydraulic chamber 136 of the first stage hydraulic energy absorption unit 32 (FIGURE 2), moving the piston 132 thereof forwardly and with it the drive rod 30, coupler adapter 24 and coupler 26 until these reach their original positions which they occupied before coupling impact.

If, at any time, due to high coupling impact, the pressure of the hydraulic fluid in the first stage hydraulic chamber 136 of the energy absorption unit 32 or in the transport conduit 34 or forward longitudinal passageway 148 reaches a dangerously high level, this pressure is transmitted from the passageway 148 through the upper bypass passageway 178 (FIGURE 4) to the pressure relief valve 182, causing the latter to open and dump the excessively high-pressure hydraulic fluid through the angle passageway 184 (FIGURES 4 and 6) directly into the end hydraulic chamber 196 of the low-pressure high-volume accumulator 40, forcing the piston 192 thereof rearwardly without requiring the hydraulic pressure fluid to pass through the restricted orifice 150 and interphase valve 42.

In the foregoing manner, the self-adjusting hydropneumatic cushioned coupling arrangement 22 of the present invention gradually absorbs the energy of impact step-by-step in increments either in a single cycle of operation for a light impact or in a succession of cycles of operation for a heavy impact, thereby preventing the coupling impact shock from ever becoming high enough to damage the cargo or other load carried by the vehicle.

What I claim is:

1. A self-adjusting cushioned vehicle coupler arrangement for mounting on a vehicle frame equipped with a vehicle coupler, said arrangement comprising:
   a coupler adapter housing securable to the vehicle frame,
   a coupler slidably mounted in said housing,
   means for securing the vehicle coupler to said adapter,
   an initial energy-absorber including a hydraulic piston operatively connected to said adapter for travel therewith and a hydraulic cylinder reciprocably receiving said piston,
   a primary hydropneumatic accumulator having a primary cylinder and a primary piston therein dividing said primary cylinder into a primary hydraulic chamber and a primary gas chamber containing a high pressure gas,
   a hydraulic fluid conduit connecting said initial energy absorber cylinder to said primary cylinder with a fluid flow-restricting orifice therebetween,
   a second hydropneumatic accumulator having a secondary cylinder and a secondary piston therein dividing said secondary cylinder into a secondary hydraulic chamber and a secondary gas chamber containing a low pressure gas,
   and control valve means hydraulically connected to opposite sides of said flow-restricting orifice and responsive to a rise in pressure to a higher pressure on the initial energy-absorber side of said orifice beyond a predetermined ratio of pressures on opposite sides of said orifice to close communication from said primary accumulator to said secondary accumulator and responsive to a rise of pressure on the accumulator side of said orifice to a predetermined ratio of pressures on opposite sides of said orifice to open communication from said orifice and primary hydraulic chamber to said secondary hydraulic chamber.

2. A self-adjusting cushioned vehicle coupler arrangement according to claim 1, wherein said control valve means includes a valve body with a control chamber communicating with the energy-absorber side of said orifice and a movable valve member controlling communication between the primary accumulator side of said orifice and said secondary accumulator and having a control motive portion extending into said control chamber.

3. A self-adjusting cushioned vehicle coupler arrangement according to claim 2, wherein said valve member is reciprocably mounted in said valve body and wherein said control motive portion includes a control piston surface within said control chamber.

4. A self-adjusting cushioned vehicle coupler arrangement according to claim 3, wherein said valve body also has a fluid distribution chamber within which said valve member controls fluid flow between said primary and secondary hydraulic chambers.

5. A self-adjusting cushioned vehicle coupler arrangement according to claim 4, wherein said valve body also has a balancing piston surface within said fluid distribution chamber and of substantially equal piston area to said control piston surface.

6. A self-adjusting cushioned vehicle coupler arrangement according to claim 5, wherein said balancing piston surface comprises an annular shoulder upon said valve member.

7. A self-adjusting cushioned vehicle coupler arrangement, according to claim 3, wherein said control piston surface comprises an end surface of said valve member.

8. A self-adjusting cushioned vehicle coupler arrangement, according to claim 4, wherein said valve body also has a valve-opening piston surface in communication with said secondary hydraulic chamber.

9. A self-adjusting cushioned vehicle coupler arrangement, according to claim 8, wherein said valve member has a valve portion thereon controlling communication between said primary and secondary hydraulic chambers and also has a head thereon of larger diameter than said valve portion disposed adjacent thereto with an annular balancing piston surface shoulder extending therebetween within said fluid distribution chamber.

10. A self-adjusting cushioned vehicle coupler arrangement, according to claim 1, wherein a hydraulic fluid bypass conduit extends between the absorber side of said orifice and said secondary hydraulic chamber and wherein a hydraulic pressure relief valve opening toward said secondary hydraulic chamber is disposed in said bypass conduit.

11. A self-adjusting cushioned vehicle coupler arrangement, according to claim 1, wherein said primary accumulator possesses a lower volume than said secondary accumulator.

12. A self-adjusting cushioned vehicle coupler arrangement, according to claim 1, wherein said primary piston is a free piston freely reciprocable within said primary cylinder.

13. A self-adjusting cushioned vehicle coupler arrangement, according to claim 1, wherein said secondary piston is a free piston freely reciprocable within said secondary cylinder.

14. A self-adjusting cushioned vehicle coupler arrangement, according to claim 1, wherein said primary and secondary pistons are free pistons reciprocable respectively within said primary and secondary cylinders.

15. A self-adjusting cushioned vehicle coupler arrangement, according to claim 1, wherein said primary and secondary accumulator cylinders are disposed adjacent one another with their axes approximately parallel.

16. A self-adjusting cushioned vehicle coupler arrangement, according to claim 15, wherein said valve means is disposed within a casing secured to one of said accumulator cylinders.

17. A self-adjusting cushioned vehicle coupler arrangement, according to claim 1, wherein said adapter has a socket therein receiving a portion of the coupler.

18. A self-adjusting cushioned vehicle coupler arrangement, according to claim 1, wherein the coupler adapter and initial energy absorber are disposed substantially in alignment with one another.

19. A self-adjusting cushioned vehicle coupler arrangement for mounting on a vehicle frame equipped with a vehicle coupler, said arrangement comprising
   means for mounting said coupler on the vehicle frame for relative movement therebetween,
   a hydraulic piston element,
   a hydraulic cylinder element reciprocably receiving said piston element,
      one of said elements being operatively connected to said coupler mounting means for movement therewith relatively to the other element in response to relative movement between the coupler and the frame,
   a higher pressure primary accumulator,
   a conduit connecting said cylinder to said primary accumulator and having a flow-restricting orifice disposed therebetween.
   a lower pressure secondary accumulator,
   means providing a passageway between said primary and secondary accumulators,
   and control valve means effective to close said passageway in response to the arising of a pressure differential across said orifice.

20. A self-adjusting cushioned vehicle coupler arrangement, according to claim 19, wherein said control valve means has a first valve control area exposed to pressure from the cylinder side of said orifice and a second valve control area exposed to pressure from the accumulator side of said orifice.

21. A self-adjusting cushioned vehicle coupler arrangement, according to claim 20, wherein said control valve means has a third valve control area exposed to pressure from said secondary accumulator.

References Cited by the Examiner
UNITED STATES PATENTS
2,911,112   11/1950   MacCurdy _____ 213—8

ARTHUR L. LA POINT, *Primary Examiner.*

MILTON BUCHLER, *Examiner.*